United States Patent [19]
Koren

[11] Patent Number: 5,638,226
[45] Date of Patent: Jun. 10, 1997

[54] SYSTEM HAVING CONTROLLED POLARITY ADDING ODD AND/OR EVEN NUMBERS OF EQUALIZATION TRANSITIONS DEPENDING UPON PULSE POLARITY

[75] Inventor: Norman L. Koren, Encinitas, Calif.

[73] Assignee: Eastman Kodak Company, Rochester, N.Y.

[21] Appl. No.: 602,388

[22] Filed: Feb. 16, 1996

Related U.S. Application Data

[63] Continuation of Ser. No. 87,250, Jul. 6, 1993, abandoned.

[51] Int. Cl.$^6$ .............................. G11B 5/09; G11B 5/035
[52] U.S. Cl. .................................................. 360/40; 360/65
[58] Field of Search .............................. 360/40, 46, 48, 360/41, 45, 65, 27; 341/58, 59; 375/12, 13, 14; 370/32.1

[56] References Cited

U.S. PATENT DOCUMENTS

| | | | |
|---|---|---|---|
| 4,484,176 | 11/1984 | Fitzpatrick | 360/40 X |
| 4,675,650 | 6/1987 | Coppersmith et al. | 360/40 X |
| 5,255,131 | 10/1993 | Buchan et al. | 360/41 |
| 5,267,096 | 11/1993 | Buchan et al. | 360/41 |
| 5,325,239 | 6/1994 | Hoogendoorn et al. | 360/27 |

OTHER PUBLICATIONS

French, Catherine A., Wolf, Jack K. and Dixon, Glenn S. "Signaling With Special Run–Length Constraints for a Digital Recording Channel" IEEE Transaction on Magnetics, vol. 24, No. 3, May 1988, p. 2092–2097.

French, Catherine A. Weathers, Anthony D. and Wolf, Jack K., "A Generalized Scheme for Generating and Detecting Recording Channel Output Waveforms with Controlled Pulse Polarity", IEEE Transaction on Magnetics, vol. 24, No. 6, Nov. 1988, pp. 2530–2532.

Weathers, Anthony D., French Catherine A. and Wolf, Jack, K., "Results on 'Controlled Polarity' Modulation and Coding," IEEE Transactions on Magnetics, vol. 25, No. 5, Sep. 1989, p. 4090–4092.

Norris, Kermit and Bloomberg, Dan S., "Channel Capacity of Charge–Constrained Run–Length Limited Codes", IEEE Transactions on Magnetics, vol. MAG–17, No. 6, Nov. 1981, pp. 3452–3455.

Schneider, Richard C., "Write Equalization in High–Linear–Density Magnetic Recording", IBM Journal of Research and Development, vol. 29, No. 6, Nov. 1985, pp. 563–568.

Schneider, Richard C., "Write Equalization for Generalized (d,k) Codes", IEEE Transaction on Magnetics, vol. 24, No. 6, Nov. 1988, pp. 2533–2535.

Koren, Norman L., "Siganal Processing in Recording Channels Utilizing Unshielded Magnetoresistive Heads", IEEE Transaction on Magnetics, vol. 26, No. 5, Sep. 1990, pp. 2166–2168.

Koren, Normal L., "Matched Filter Limits and Code Performance in Digital Magnetic Recording", IEEE Transactions on Magnetics, vol. 27, No. 6, Nov. 1991, pp. 4596–4599.

(List continued on next page.)

*Primary Examiner*—W. R. Young
*Assistant Examiner*—Patrick Wamsley
*Attorney, Agent, or Firm*—William F. Noval

[57] ABSTRACT

A controlled polarity recording channel capable of resolving a d+1 run-length, same-polarity data pattern. The system includes a modulation encoder, a write equalizer, a signal channel, a read equalizer, a detector, and a modulation decoder. The read equalizer may optionally include a decision feedback equalization circuit for restoring a d.c. component of an isolated pulse. The modulation encoder and decoder operate in a (d,k) run-length limited modulation code format. Also disclosed is a method for designing a read equalizer for resolving the d+1 run-length, same-polarity data pattern upon readback in controlled polarity systems.

32 Claims, 6 Drawing Sheets

OTHER PUBLICATIONS

Lin, Yinyi and Wolf, Jack K., "Combined ECC/RLL Codes", IEEE Transactions on Magnetics, vol. 24, No. 6, Nov. 1988 pp. 2525–2529.

French, Catherine A., "Distance Preserving Run–Length Limited Codes", IEEE Transactions on Magnetics, vol. 25, No. 5, Sep. 1989, pp. 4093–4095.

Richard Dorf, ed., "The Electrical Engineering Handbook", CRC Press, 1993, chapter 6, Laplace Transform, p. 149, chapter 10, Transfer Functions of Filters, p. 189, and chapter 11, Frequency Response, p. 198.

Robert Kost and Philip Brubaker, "Arbitrary Equalization with Simple LC Structures", *IEEE Trans. on Magnetics*, vol. MAG–17, No. 6, p. 3346, Nov., 1981.

Arthur Geffon, "A 6K BPI Disk Storage System using MOD–11 Interface", *IEEE Trans. on Magnetics*, vol. MAG–13, No. 5, p. 1205, Sep.. 1977.

C. Dennis Mee and Eric D. Daniel, *Magnetic Recording Handbook: Technology and Applications*, McGraw Hill, 1990, part 2, chapter 4, 4.6.3.1, pp. 855–857.

A. D. Weathers and J. K. Wolf, "Biased Run–Length Modulation", *IEEE Trans. on Magnetics*, vol. 27, No. 6, p. 4807, Nov., 1991.

Chao Chi, "Characterization and Spectral Equalization for High–Density Disk Recording", *IEEE Trans. on Magnetics*, vol. MAG–15, No. 6, p. 1447, Nov., 1979.

Norman L. Koren, "Signal Processing for Single and Dual Element Unshielded Magnetoresistive Heads", presented at *The Magnetic Recording Conference*, held Aug. 4, 1994, at San Diego, CA.

Norman L. Koren, "Signal Processing for the Dual Magnetoresistive Head", a white paper distributed by Eastman Kodak Co. dated Apr. 7, 1994.

Gabor Temes & Jack LaPatra, *Circuit Synthesis and Design*, McGraw–Hill, 1977, pp. 213–241.

C.S. Chi & K. A. Frey, "Directional 'CRA' for Ternary Digital Recording", *IEEE Trans. on Magnetics*, vol. MAG–18, No. 6, 1259–61, Nov., 1982.

Luetzeler, J., "An Experimantal Digital HDTV Cassette Recorder", Broadcast Sessions, Montreux, pp. 302–316, Jun. 10–15, 1993.

Siegel, Paul H. et al., "Modulation and Coding For Information Storage", IEEE Communications Magazine, vol. 29, No. 12, 01 Dec. 1991, pp. 68–86.

SYSTEM HAVING CONTROLLED POLARITY ADDING ODD AND/OR EVEN NUMBERS OF EQUALIZATION TRANSITIONS DEPENDING UPON PULSE POLARITY

This is a Continuation of application U.S. Ser. No. 08/087,250, filed 6 Jul. 1993, now abandoned.

FIELD OF THE INVENTION

The present invention relates to controlled polarity recording and retrieval of data. More specifically, the present invention provides system, apparatus and method for controlled polarity digital magnetic recording. In particular, the present invention relates to a system for magnetic recording and retrieval of digital data having equalization of readback pulses of a controlled polarity, charge-constrained, run-length limited format.

BACKGROUND OF THE INVENTION

In digital data recorded in a non-return to zero inverted (NRZI) format, a "1" appears as a readback pulse with a single peak and a "0" as the absence of a pulse within a predetermined time interval ("bit cell" or "detection window"). In conventional peak detecting digital magnetic recording systems, in which a "1" is recorded as a transition in the magnetization state of a magnetic storage medium, written by switching the polarity of the electrical current energizing the write head, readback pulses alternate in polarity. In controlled polarity (CP) recording systems, successive readback pulses may have either the same or opposite polarity. The additional pulse polarity information is used to increase the information capacity of the recording channel.

CP recording is typically used with (d,k) run-length limited (RLL) codes, where d is a minimum run-length (i.e., the minimum number of "0"s between successive "1"s) and k is the maximum run-length (i.e., the maximum number of "0"s between successive "1"s). In CP recording, for run-lengths of d+1, d+3, etc., successive "1"s pulses have same-polarity. Moreover, in CP recording, for run-lengths of d, d+2, d+4, etc., successive "1"s pulses have opposite-polarity.

CP recording is described in: French, Catherine A., Wolf, Jack K. and Dixon, Glenn S. "Signalling With Special Run-Length Constraints for a Digital Recording Channel" IEEE Transactions on Magnetics, vol. 24, no. 3, May 1988, p. 2092–2097; French, Catherine A., Weathers, Anthony D. and Wolf, Jack K., "A Generalized Scheme for Generating and Detecting Recording Channel Output Waveforms with Controlled Pulse Polarity," IEEE Transactions on Magnetics, vol. 24, no. 6, November 1988, p. 25–30; and Weathers, Anthony D., French, Catherine A. and Wolf, Jack K., "Results on 'Controlled Polarity' Modulation and Coding," IEEE Transactions on Magnetics, vol. 25, no. 5, September 1989, p. 4090–4092.

Prior art CP recording channels used simple low pass filters to reduce the noise in an enhanced peak detector. It was not known how to use pulse slimming equalizers in CP recording channels. Pulse slimming equalizers are required to achieve optimum recording density in peak detector channels, even thought magnetic recording channels using peak detectors have an effective signal-to-noise ratio (SNR) loss as a relative trade-off for a reduction in intersymbol interference peak shift. In the past, CP recording channels were unable to resolve same-polarity pulses corresponding to the d+1 run-length. Exclusion of the d+1 run-length from the modulation code limits channel recording capacity.

In prior CP run-length constraints, there were the minimum run-length of d plus an even number, greater than or equal to zero, of "0"s between transitions of opposite polarity and the minimum run-length of d plus an odd number, greater than or equal to three, of "0"s between transitions of same-polarity. In CP recording, detection window size for peak detection of a readback waveform is doubled, as compared to traditional binary schemes with equivalent packing density.

In standard m/n (d,k) RLL codes, m-data bits are mapped into n-code bits. The code rate, r, is equal to m/n. If $T_d$ is the data period, then the clock period of the code (code period), $T_c$, is equal to m/n $T_d$. Run-length constraints can be alternatively described as a minimum of d+1 and a maximum of k+1 code periods between written "1"s. The minimum time between transitions, $T_{min}$, is equal to (d+1)$T_c$. For a d+1 run-length, a time interval of (d+2) $T_c$ was previously unresolvable for same-polarity pulses. Thus, a minimum time between same polarity pulses, $T_0$, was set to $T_{min}$=(d+4) $T_c$. In the past, available code patterns were reduced by this constraint. Also reduced were the potential code rate and recording density.

With RLL codes, a readback pulse peak detected anywhere within a detection window is assumed to have been written at the center of that window. RLL codes are used to make a code self-clocking by limiting the maximum run-length of "0"s. As is known, k cannot be too large for the RLL code to be self-clocking. Additionally, RLL codes are often used to increase $T_{min}$ to a value greater than $T_d$.

In magnetic recording, write current charge is the integral of the normalized write current, $i_w$. This integral is defined between some arbitrary starting time and the present, where time is normalized to $T_c$. In which case, $i_w$ is equal to +/−1, where the sign of $i_w$ can alternate at each transition. To limit accumulated charge, d.c.-free RLL modulation codes are sometimes used, wherein the maximum accumulated charge, c, is constrained. Such codes are called charge-constrained RLL (CCRLL) codes.

The maximum capacity of accumulated charge of CCRLL codes can be calculated, and capacity loss for a given charge constraint for conventional (d,k) RLL recording can also be determined. For CCRLL codes, the maximum theoretical code rate, and thus channel capacity, is a function of d, k and c. References describing channel capacity of CCRLL codes include: Norris, Kermit and Bloomberg, Dan S., "Channel Capacity of Charge-Constrained Run-Length Limited Codes," IEEE Transactions on Magnetics, vol. MAG-17, no. 6, November 1981, p. 3452–3455; Marcus, B. H., Siegel, P. H. and Wolf, J. K., "Finite-State Modulation Codes for Data Storage," IEEE Journal on Selected Areas in Communications, vol. 10, no. 1, January 1992, p. 5; and the above-mentioned article entitled "Signalling with Special Run-Length Constraints for a Digital Recording Channel." In practice, actual codes are designed to have code rates as close as possible to the recording channel capacity without excessive hardware complexity. CCRLL codes are typically used in magnetic recording systems with rotary transformers, which cannot pass d.c. in the write current.

In enhancing performance of certain peak detection channels, techniques for pulse slimming a write current are often employed. One technique, write equalization, adds short wavelength pulses to a write current to effect pulse slimming. These added short wavelength pulses are not resolved during readback. Write equalization is described in:

Schneider, Richard C., "Write Equalization in High-Linear-Density Magnetic Recording," IBM Journal of Research and Development, vol. 29, no. 6, November 1985, p. 563–568; Schneider, Richard C., "Write Equalization for Generalized (d,k) Codes," IEEE Transactions on Magnetics, vol. 24, no. 6, November 1988, p. 2533–2535; Koren, Norman L., "Signal Processing in Recording Channels Utilizing Unshielded Magnetoresistive Heads," IEEE Transactions on Magnetics, vol. 26, no. 5, September 1990, p. 2166–2168; and Koren, Norman L. "Matched Filter Limits and Code Performance in Digital Magnetic Recording," IEEE Transactions on Magnetics, vol. 27, no. 6, November 1991, p. 4596–4599.

In write equalized systems with times normalized to the clock period of the code, $T_c$, pulses of length W are added to the write current starting at the Pth "0" following a "1", where P is equal to d+1. The transition representing a "1" may be delayed by Q. The period of added pulses is R. In prior write equalization, there were 1/R added pulses per code period $T_c$, and R was limited to values of 1/N, where N is an integer greater than or equal to 1. In prior write equalized systems, 1/R is an integer which is typically fixed at 1 (i.e., R=1) to avoid unnecessarily high write frequencies, and there is at least one added pulse per code "0". In such systems, the pulse length W of the added pulses, as well as the period R, are bounded by the equation $0 \leq W/R \leq 0.5$. For the RLL codes to be d.c.-free, W/R must equal 0.5.

In the prior non-CP write equalization, write equalization is a linear process having a transfer function of:

$$G_{wreq}(\omega) = e^{-j\omega T_c Q} \cdot \frac{(1 - e^{-j\omega T_c W})(1 + e^{-j\omega T_c P})}{1 - e^{-j\omega T_c R}} \quad (1)$$

Where $G_{wreq}(\omega)$ is the transfer function in the frequency domain; $T_c$ is the clock period of the code; P is equal to d+1; and where added pulse length W, delay Q and added pulse period R are normalized to values of $T_c$.

A read equalizer transfer function is expressed mathematically as a ratio of two polynomials in the complex (S) plane, where roots of the polynomial numerator are known as "zeros" and roots of the polynomial denominator are known as "poles". Read equalizers represented by poles and zeros can be realized as RLC (resistive-inductive-capacitive) networks by using techniques of circuit synthesis theory. These techniques are well-known in the art of the present invention. Such techniques are described in Temes, Gabor C. and LaPatra, Jack W., "Circuit Synthesis and Design," McGraw-Hill, 1977. Moreover, equalizer chips are now available that allow pole and zero values to be programmed. An example of such a chip is the IMP4250 Programmable Continuous-time Filter available from International Microelectronic Products of San Jose, Calif., in which up to six poles and six zeros can be programmed.

Linearity implies that a data pattern can be simulated by linearly superimposing isolated pulses comprising the NRZI . . . 0001000 . . . data pattern. These pulses normally have alternating polarity.

In the past, a read equalizer for resolving d+1 run-length, same-polarity code patterns during readback did not exist in CP systems. Moreover, in the past, CP recording was not understood to be a case of write equalization with a linear transfer function. It is desirable, therefore, to provide an equalized recording channel for CP which includes readback equalization to resolve d+1 run-length, same-polarity code patterns.

SUMMARY OF THE INVENTION

The present invention provides a CP system for recording and retrieving data which resolves d+1 run-length, same-polarity code patterns. The equalized recording channel of the present invention includes both a write equalizer and a read equalizer for recording and retrieving d+1 run-length, same-polarity code patterns. The present invention provides a controlled polarity system having an equalized recording channel for recording and retrieving data, the system comprising: an encoder for receiving a first data signal representing the data and for providing a first encoded signal therefrom, the encoder encoding in a (d,k) run-length limited modulation code to provide the first encoded signal, the first encoded signal having a clock period of the code; a first equalizer coupled to the encoder for receiving the first encoded signal and for providing a first equalized signal therefrom; a signal channel coupled to the first equalizer for recording of the first equalized signal and for providing a readback signal upon retrieval of the first equalized signal as recorded; a second equalizer coupled to the signal channel for receiving the readback signal and for providing a second equalized signal therefrom; a detector coupled to the second equalizer for receiving the second equalized signal and for providing a second encoded signal therefrom; and a decoder coupled to the detector for receiving the second encoded signal and for providing a second data signal therefrom.

The ability to resolve same-polarity pulses corresponding to the d+1 run-length increases CP channel recording capacity over prior art CP channels. A method for resolving d+1 run-length, same-polarity code patterns is provided by the present invention. The present invention provides a method for controlled polarity recording and retrieval of data comprising the steps of: receiving a first data signal; encoding the first data signal into a first encoded signal with a (d,k) run-length limited code; equalizing the first encoded signal through linear processing to provide a first equalized signal; converting the first equalized signal into a first recordable signal representative of the first equalized signal; recording the first recordable signal; retrieving the first recordable signal and providing a retrieved signal of the first recordable signal; equalizing the retrieved signal to provide a second equalized signal; detecting events of the second equalized signal to provide a second encoded signal substantially similar to the first encoded signal; and decoding the second encoded signal to provide a second data signal substantially similar to the first data signal.

The present invention also provides a subsystem for write equalization as a linear process which adds pulses having a period of 2/(2N−1), where N is an integer greater than or equal to one in units of code period for CP recording. Longer pulse periods as compared to the prior art can be used for write equalization with the present invention. Thus, the present invention provides in a controlled polarity system for linear processing of an input signal to record data, the data represented in the form of the input signal, the input signal having pulses representative of digital ones and zeros, an apparatus for encoding and equalizing the input signal for subsequent recording of the data, the apparatus comprising: a modulation encoder for receiving the input signal and for providing a modulated encoded signal, the modulation encoder encoding in a (d,k) run-length limited code to provide the modulated encoded signal, where d is a minimum number of digital zeros between successive digital ones and where k is a maximum number of digital zeros between successive digital ones; and a write equalizer coupled to the modulation encoder for receiving the modulated encoded signal and for equalizing the modulated encoded signal by adding transitions to the modulated encoded signal to provide an equalized signal for recording, the write equalizer having a transfer function equation of:

$$G_{wreq}(\omega) = e^{-j\omega T_c Q} \frac{(1 - e^{-j\omega T_c W})(1 + e^{-j\omega T_c P})}{1 - e^{-j\omega T_c R}} \quad (2)$$

where R represents a value associated with a period related to the added pulses, the period being approximately 2/(2N−1) for N an integer greater than or equal to one, W represents a value associated with a pulse length related to the added pulses, $T_c$ represents a value associated with a normalized code period, Q represents a value associated with a delay of a transition representing a digital one, P represents a value associated with a delay of added digital zero transitions following the transition representing a digital one, and Q, W, P and R are in units of $T_c$.

Prior art write equalized systems were limited to adding write equalization transitions, where two written transitions comprise a transitions. The period of the added pulses was 1/N. Thus, the added pulse period of the present invention can be greater than the added pulse period of prior art write equalized systems. With the present invention, one or more transitions may be added to a signal, as compared with adding pulses of the prior art.

In accordance with the present invention, a read equalizer may be designed to resolve write equalized signals having added pulse transitions, and also may be designed to resolve d+1 run-length, same-polarity coded patterns. Design of a read equalizer according to the present invention is a function of the write equalized signal. The present invention, therefore, provides a method for read equalizer design, namely a method of determining poles and zeros for a characteristic transfer function for a read equalizer for controlled polarity recorded data write equalized through linear write equalization processing, the read equalizer for read equalizing the controlled polarity recorded data, the method comprising the steps of: providing a programmed computer; providing to the computer a read equalizer output equation which represents a read equalized output signal; providing to the computer an isolated write equalized pulse input which represents a write equalized isolated signal; providing to the computer predetermined approximate values of a first set of poles and zeros; and processing the read equalizer output equation, the isolated write equalized pulse input and the predetermined approximate values of the first set of poles and zeros with the computer for producing a second set of poles and zeros for determining the characteristic transfer function; whereby the read equalized output signal in response to the write equalized isolated signal may be approximated. The read equalizer designed in accordance with the present invention allows same-polarity pulses corresponding to the d+1 run-length to be resolved.

Equalization with added pulses of a longer pulse length than that of the prior art of write equalization may be achieved with the present invention. Optimum (i.e., pulse slimming) read equalization was omitted in the prior art because CP recording was not recognized as a type of linear write equalization.

The present invention provides an apparatus for equalizing controlled polarity recorded data having equalized d.c.-free isolated pulses, the equalized d.c.-free isolated pulses each having a pulse width, the apparatus comprising: a read equalizer coupled for receiving the recorded data, the read equalizer characterized by a transfer function, the read equalizer for providing an output signal from the recorded data in accordance with the transfer function; the transfer function including a predetermined cutoff frequency $f_c$, the cutoff frequency $f_c$ inversely proportional to the pulse width; the transfer function including a frequency $f_L$ for approximating risetimes of the equalized d.c.-free isolated pulses, the frequency $f_L$ having an undershoot risetime approximating the risetimes of the equalized d.c.-free isolated pulses.

Other features of the present invention are disclosed or apparent by reference to the Detailed Description of the Invention section of the disclosure herein.

BRIEF DESCRIPTION OF THE DRAWINGS

For fuller understanding of the present invention, reference is made to the accompanying drawing in the following Detailed Description Of The Invention.

Reference numbers refer to the same or equivalent part of the present invention throughout the several figures of the drawing.

DETAILED DESCRIPTION OF THE INVENTION

It should be understood that CP recording is for increasing recorded density of high density magnetic recording systems, as CP recording increases the number of significant recorded symbols (i.e., − peak, 0 and + peak instead of peak and 0). The present invention is the first to recognize CP recording as a special case of write equalization which has a linear transfer function. As a result of the linear transfer function, a write equalized ... 0001000 ... data pattern may be used as an isolated pulse response, upon which a read equalizer design may be based. This read equalizer is designed to slim the isolated readback pulse (i.e., the equalizer output for the written isolated pulse).

Prior art CP recording used a simple low pass filter for analog signal processing in the read channel. Thus, the pulse was not slimmed, and the minimum distance for same polarity peaks (the d+1 run-length) could not be resolved in high density magnetic recording. The present invention allows for the inclusion of the d+1 run-length in the modulation code, thereby increasing the maximum possible code rate, wherein high density magnetic recording may be achieved with CP.

Additionally, it should be understood that transitions, sometimes representative of ones in NRZI, are used to describe events within a signal. These events may be associated with encoded data or equalization of the signal.

Recording System

Figure 1:
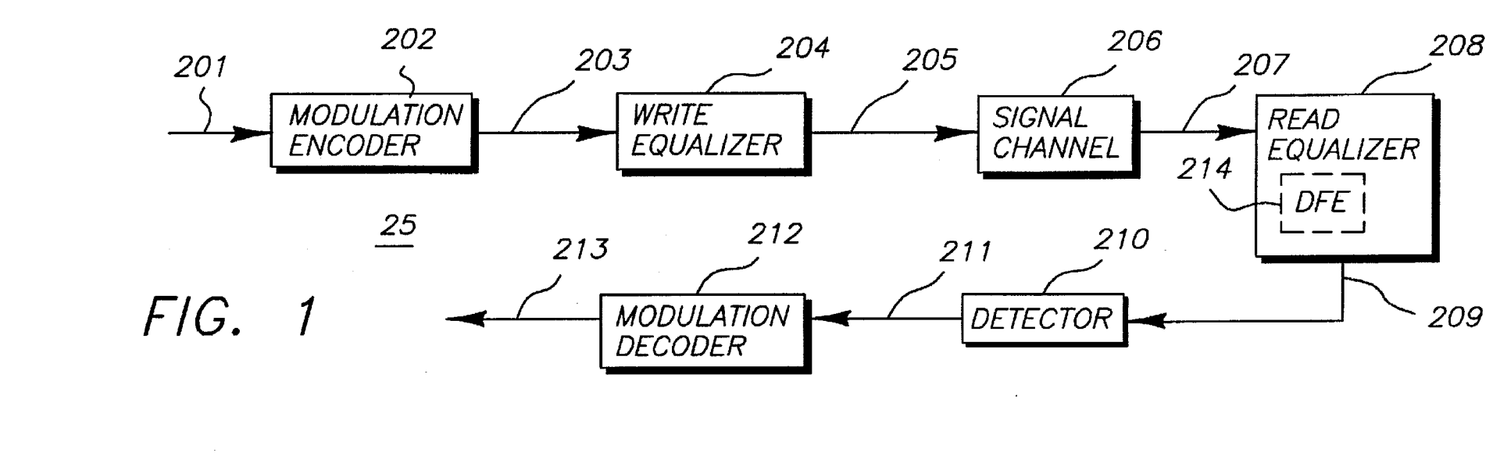
FIG. 1 shows a block diagram of a recording system 25 according to the principles of the present invention.

Referring to FIG. 1, a block diagram of a recording system 25, according to the principles of the present invention, is shown. Recording system 25 comprises modulation encoder 202, write equalizer 204, signal channel 206, read equalizer 208, detector 210 and modulation decoder 212. Modulation encoder 202, signal channel 206 and modulation decoder 212 form no part of the present invention. The design of write equalizer 204, read equalizer 208, and detector 210, as well as recording system 25, are the subjects of the present invention.

A recording system 25 as described herein is capable of recording and retrieving data. Therefore, it should be understood that the term recording system as used herein, is not limited to recording of data only.

Modulation Encoder

Modulation encoder 202 receives a data signal 201. Data signal 201 comprises data in binary form. Modulation encoder 202 encodes data signal 201 using an m/n (d,k) RLL modulation code. As explained above, RLL modulation codes are self-clocking for values of k which are not too large. In typical CP recording, CCRLL codes are used. In the preferred embodiment of the present invention, modulation encoder 202 encodes data signal 201 in a m/n (d,k) CCRLL modulation code. More specifically, in the preferred embodiment of the present invention, d is chosen to equal either 2 or 4. This choice is explained elsewhere in this specification. Modulation encoder 202 provides a modulated encoded signal 203 from the above-mentioned encoding of data signal 201. Encoders, such as modulation encoder 202, are well known in the art of the present invention.

Write Equalizer

Write equalizer 204 receives encoded signal 203. Write equalizer 204 applies write equalization to encoded signal 203. Write equalization of the present invention for CP recording is a linear process. The transfer function of write equalizer 204 is:

$$G_{wreq}(\omega) = e^{-j\omega T_c Q} \frac{(1 - e^{-j\omega T_c W})(1 + e^{-j\omega T_c P})}{1 - e^{-j\omega T_c R}} \quad (2)$$

where time is normalized to code periods. Thus, Q, P, R and W are in units of $T_c$. Pulses of length W are added to the write current. As with standard write equalization, P is equal to d+1. The transition representing a "1" may be delayed by Q. The period of the added pulses is R. In accordance with the present invention, values of added pulse period R=2/(2N−1) in code periods for N an integer greater than or equal to 1. In the prior art, CP recording was not recognized as a linear process or as a special case of write equalization. In the preferred embodiment, an RLL modulation code where d≧2, N=1, R=2 and W=1 is employed. It should be understood that a condition of CP recording is that W/R=1/2. Therefore, W may alternatively be thought of as one-half the added pulse period. W is therefore the spacing between added transitions.

Additionally, for d=0 RLL modulation codes, N must be greater than 1 to avoid resolving added short wavelength pulses of length (or width) W. As is known in the art of the present invention, Q is selected for performance and read equalizer realizability. Write equalizer 204, in accordance with the present invention, generates a CP signal. Write equalizer 204 adds an odd number of equalization transitions to the write current for code 0's between written transitions for code 1's that are to be read back as same polarity pulses, and adds an even number of equalization transitions to the write current for code 0's between written transitions for code 1's that are to be read back as opposite polarity pulses. The added transitions are evenly spaced apart and are added per code period to the write current to provide write equalized signal 205.

In accordance with the preferred embodiment of the present invention, for every code "0" starting at the (d+1)th code "0" following a NRZI code "1", a write current transition is added to encoded signal 203. Additionally, in the preferred embodiment of the present invention, the added pulse period, R=2/(2N−1), comprises an added pulse which is twice that of the prior art added write equalization pulse period. In the present invention, the length of added pulses, each of which consists of two write current transitions, is double that of prior write equalization having R equal to 1 and having at least one added pulse per code "0". Thus, less than 1 added pulse for write equalization period $T_c$ can be used with the present invention. Moreover, the present invention provides any odd number of added pulses per two $T_c$ for write equalization. In the preferred embodiment of the present invention, one added pulse per two $T_c$ is used for write equalization. Write equalizer 204 provides write equalized signal 205 in accordance with the present invention.

Moreover, in the preferred embodiment, W/R is equal to 0.5, and thus equalized signal 205 provided by write equalizer 204, is d.c.-free. The requirement that W/R=0.5 in accordance with the present invention, makes the write equalized isolated pulse d.c.-free. It should be understood that the read equalized isolated pulse must also be d.c.-free to avoid excessive low frequency noise boost. Two classes of d.c.-free equalized isolated pulses (symmetrical and causal) are discussed elsewhere in this specification. Each of these two classes of d.c.-free equalized isolated pulses of the read equalizer take advantage of long wavelength response of unshielded magnetoresistive (UMR) or dual magnetoresistive (DMR) heads. Because equalized pulses are d.c.-free, read channel baseline shift can be a problem in patterns with several successive same-polarity pulses. This problem is overcome with CCRLL codes and with decision feedback equalization (DFE) as explained elsewhere herein.

In the (d,k) RLL modulation code according to the present invention, there are spacings of $T_c$ (d+1), $T_c$ (d+3), etc. and of $T_c$ (d+2), $T_c$ (d+4), etc. In the $T_c$ (d+1), $T_c$ (d+3), etc. spacings, a readback pulse will have opposite-polarity as the previous readback pulse. In the $T_c$ (d+2), $T_c$ (d+4), etc. spacings, a readback pulse will have same-polarity as the previous readback pulse.

The transfer function notation for write equalizer 204 allows recording system 25 to be analyzed as a linear system with a characteristic isolated pulse (response to the NRZI . . . 0001000 . . . code pattern). Since data pattern waveforms may be derived form the linear superposition of characteristic isolated pulse, the characteristic isolated pulse may be used as a basis for read equalizer design. Read equalizer design is discussed elsewhere in this specification. Therefore, as write equalization is a linear process in accordance with the present invention whose transfer function is given by equation (2), a write equalized isolated pulse may be defined as a readback signal arising in response to a CP-encoded NRZI . . . 0001000 . . . data pattern. It should also be understood that the design of a read equalizer in accordance with the present invention arises from a new understanding that CP recording can be described as a special type of write equalization applied to m/n (d,k) RLL modulation codes.

Signal Channel

Signal channel 206 receives write equalized signal 205 and provides readback signal 207. It should be understood that the term "signal channel," as used herein, refers to the transducer means and data media for recording and retrieving data. The preferred embodiment of the present invention is directed to digital magnetic recording and retrieval of data. For example, transducer means can include a record and readback head. Alternatively, transducer means can comprise separate heads to record and readback. Such heads are well known in the art of the present invention and include UMR heads, DMR heads, shielded magnetoresistive (MR) heads, inductive readback heads, rotary transformers, and other forms of digital data recording and retrieving means.

The term "data media" includes magnetic tape, magnetic disk (referring to computer media), magnetic disc (referring to audio media), and other forms of magnetic recording media. It should be understood that CCRLL codes are used in magnetic recording systems with rotary transformers which cannot pass d.c. in the write current; and CP recording employing UMR or DMR heads to avoid problems arising from head saturation.

In particular, the present invention is particularly well suited for: digital magnetic recording of high density data, and digital magnetic recording operating at a high frequency. Specifically, a recording density in the range of approximately greater than 100,000 bits per inch is preferred; however, recording densities less than or equal to 100,000 bits per inch may be used with the present invention. Thus, the present invention is particularly suited to systems employing readback heads with unusually high long wavelength sensitivity such as UMR or DMR heads. Performance advantages of the present invention are greatest with the present invention when employed with UMR or DMR heads. However, use of CP recording with inductive and shielded MR heads may be advantageous with a causal read equalized pulse and Decision Feedback Equalization (DFE) as explained elsewhere herein. Also, it should be noted that CP recording is particularly advantageous when used with particulate magnetic tape.

Read Equalizer

In accordance with the present invention, read equalizer 208 permits use of modulation codes with same-polarity pulse run-lengths as small as d+1. Read equalizer 208 is a pulse shaping equalizer for CP recording. Design of read equalizer 208 is based on understanding that CP recording is a special form of write equalization, as explained herein. Because write equalization is a linear process, a write equalized isolated pulse arising in response to a NRZI . . . 0001000 . . . code pattern can be used as the basis for read equalizer design.

Because W/R=0.5 in CP recording, according to the present invention, the added pulse width is half the pulse period and the write equalized isolated pulse is d.c.-free. The read equalized isolated pulse must therefore be d.c.-free in order to avoid excessive low frequency equalizer gain, because excessive low frequency equalizer gain leads to excessive noise. The present invention discloses a read equalizer whose isolated pulse response approximates a symmetrical isolated pulse, and a read equalizer whose equalized isolated pulse response approximates a causal isolated pulse. Two frequency domain equations describing the idealized symmetrical isolated pulse and the idealized causal isolated pulse for d.c.-free read equalized isolated pulses are:

A. Symmetrical: $F_{sym}(f) = \cos^n\left(\frac{\pi f}{2f_c}\right)\frac{f}{f+f_L}$ ; $|f| \leq f_c$  (3)

$= 0;$ $|f| > f_c$

B. Causal: $F_{caus}(f) = \cos^n\left(\frac{\pi f}{2f_c}\right)\frac{f}{f-jf_L}$ ; $|f| \leq f_c$ $= 0;$ $|f| > f_c$ $f_L \ll f_c$ where $f_c$ is the cutoff frequency (inversely related to the added pulse width), and $f_L$ is a frequency which is inversely related to the pulse rise and fall times.

Equations (3A) and (3B) are targets for a read equalizer design for CP recorded equalization pulses. The corresponding time domain pulses for the equations (3A) and (3B) may be obtained from the inverse Fourier transform of those equations.

Figure 2:
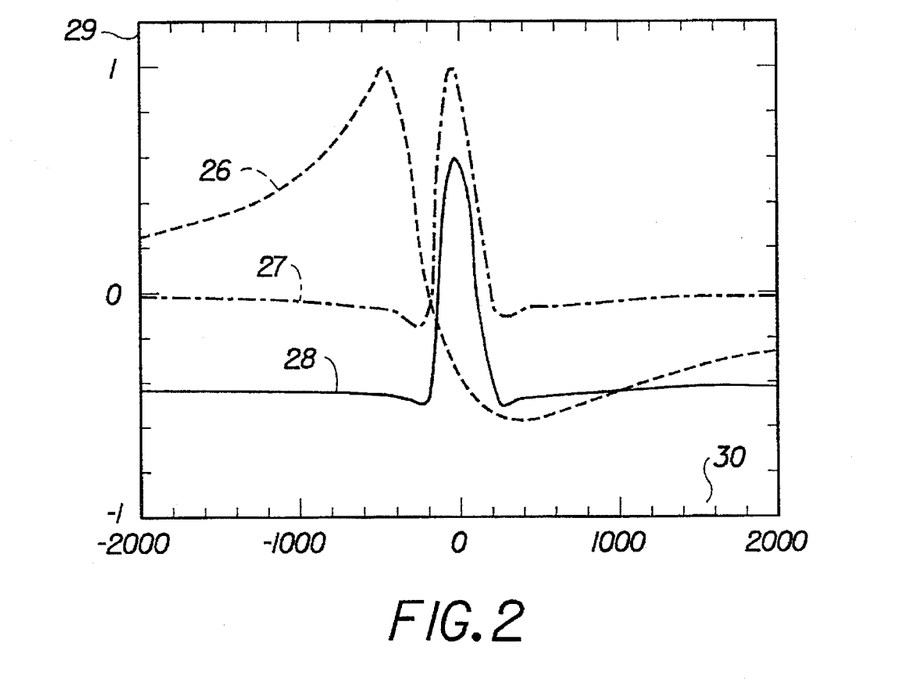
FIG. 2 shows a graphical representation of processing a symmetrical isolated pulse in accordance with the present invention.
Figure 3:
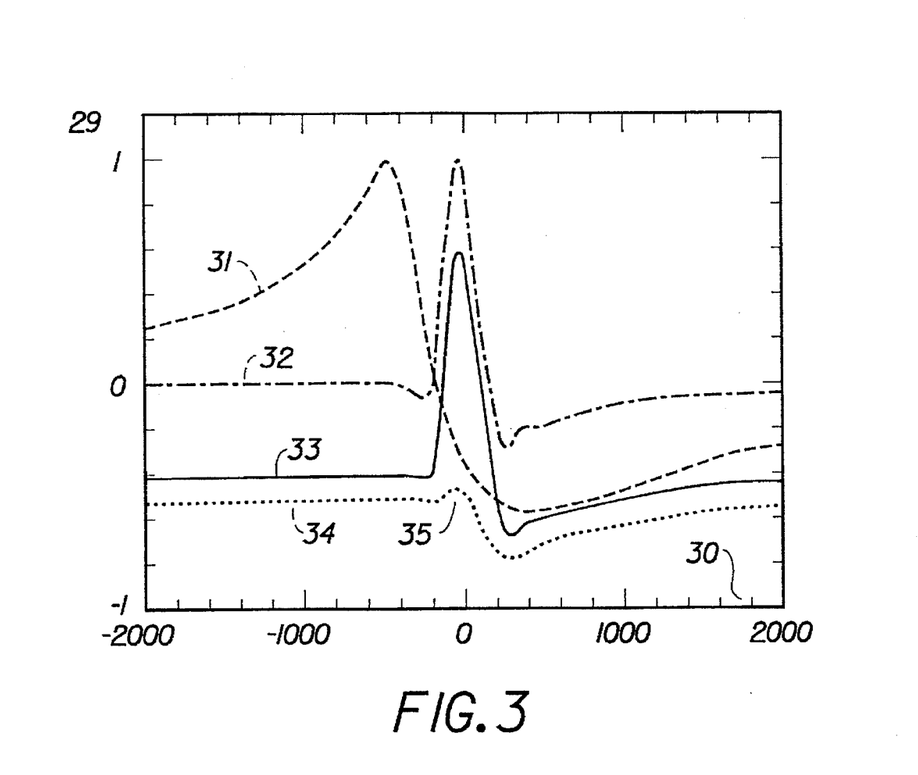
FIG. 3 shows a graphical representation of processing a causal isolated pulse in accordance with the present invention.

Referring to FIG. 2 and FIG. 3, inverse Fourier transformations of equations (3A) and (3B), respectively, are illustrated for a signal where n is equal to 4 and $f_c/f_L$ is approximately equal to 50.

With continuing reference to FIG. 2, input pulse 26, output pulse 27 and target pulse 28 are shown. Target pulse 28 is indicated by the solid line; output pulse 27 is indicated by the segmented line; and input pulse 26 is indicated by the dashed line. The bottom or X-axis 30 is time, indicated in units of nanoseconds (ns), and the vertical or Y-axis 29 is normalized signal voltage. The symmetrical isolated pulse of FIG. 2 is for (3, 15) CCRLL modulation code for CP recording, and is essentially similar to the pulses for the (2,k) and (4,k) modulation codes in the preferred embodiment of CP recording. Input pulse 26 is passed through a read equalizer 208 designed in accordance with the present invention. While only a single input pulse 26 is used for explanatory purposes, it should be understood that a plurality of pulses comprising readback signal 207 are actually received to read equalizer 208. Read equalizer 208 is designed to produce a pulse based on target pulse 28. As explained above, target pulse 28 is determined from Equation (3A). For output pulse 27, a read equalizer 208 having 7 poles and 2 zeros was designed to effect the pulse slimming or shaping of input pulse 26 into output pulse 27. However, it should be understood that any of a variety of combinations of poles and zeros can be used for read equalizer 208. Symmetrical target pulse 28 is particularly well matched to the UMR head's time domain response, which has a gradual pulse risetime. The equalized isolated pulse response (output pulse 27) approximates the symmetrical isolated pulse (target pulse 28) given from equation (3A).

In an alternate embodiment, read equalizer 208 has an equalized isolated pulse response which approximates causal isolated pulse, target pulse 33. Target pulse 33, given from equation (3B), is used for producing output pulse 32 from input pulse 31 and DFE difference pulse 34, as shown in FIG. 3. DFE difference pulse 34 is indicated by the dotted line. Target pulse 33 may be obtained from passing a pulse with frequency domain representation $\cos^n(\pi f/2f_c)$ through a simple RC high-pass filter with $f_L=1/(2\pi RC)$. It should be noted that the frequency domain of $\cos^n(\pi f/2f_c)$ has a d.c. content. The notation RC stands for a filter having a resistive (R) and capacitive (C) components. The $\cos^n$ pulse has been used as an equalizer target for inductive heads. The $\cos^n$ pulse has very little energy prior to the main pulse, and thus it is well suited to be the forward equalizer signal of a DFE system. Such a DFE system could correct baseline shift by restoring the d.c. content of the isolated pulse.

Thus, read equalizer 208 may be enhanced by means of DFE 214 for restoring absent d.c. to an equalized isolated pulse. DFE mitigates baseline shift, and thus improves the amplitude threshold channel performance. Baseline shift is present when the isolated pulse lacks a d.c. component, and hence is characterized by long undershoot tails. Use of DFE offers significant performance advantages with readback heads having unusually high long wavelength sensitivity, such as UMR or DMR heads. Read equalizer 208 can also be used with inductive and shielded MR heads. Additionally, CCRLL modulation codes may be employed with any type of readback head to mitigate baseline shift that can occur with sequences of same-polarity pulses.

Equations (3A) and (3B) are not intended to be unique or exclusive representations of the equalized isolated pulses for CP recording. Rather, these equations have been chosen due to their simple relationships between the equalized pulse properties and equation parameters. For example, the pulse width is inversely proportional to $f_c$; and the rise and fall times of the gradual undershoot are inversely proportional to $f_L$. In practice, $f_L$ is set so the undershoot rise and fall times approximate the UMR or DMR write equalized isolated pulse depending on which readback head is employed.

Decision Feedback Equalization

DFE, which can be employed with the causal readback pulse, is a means for restoring the d.c. component of the isolated pulse. Referring to FIG. 3, DFE difference pulse 34 is the difference between the ideal causal d.c.-free re-equalized pulse, i.e., target pulse 33, and a $\cos^n$ pulse (not shown). Subtracting DFE difference pulse 34 from target pulse 33 would result in a $\cos^n$ pulse with the required d.c. component. Upon detection of a qualified zero-crossing, DFE 214 subtracts a signal approximating DFE difference pulse 34 from causal equalized signal, output pulse 32. Small positive peak 35, at the beginning of DFE difference signal 34, is an artifact of calculation. Small positive peak 35 is caused by the high-pass filtered target pulse 33 being slightly narrower than the $\cos^n$ pulse with the same $f_c$.

Figure 4:
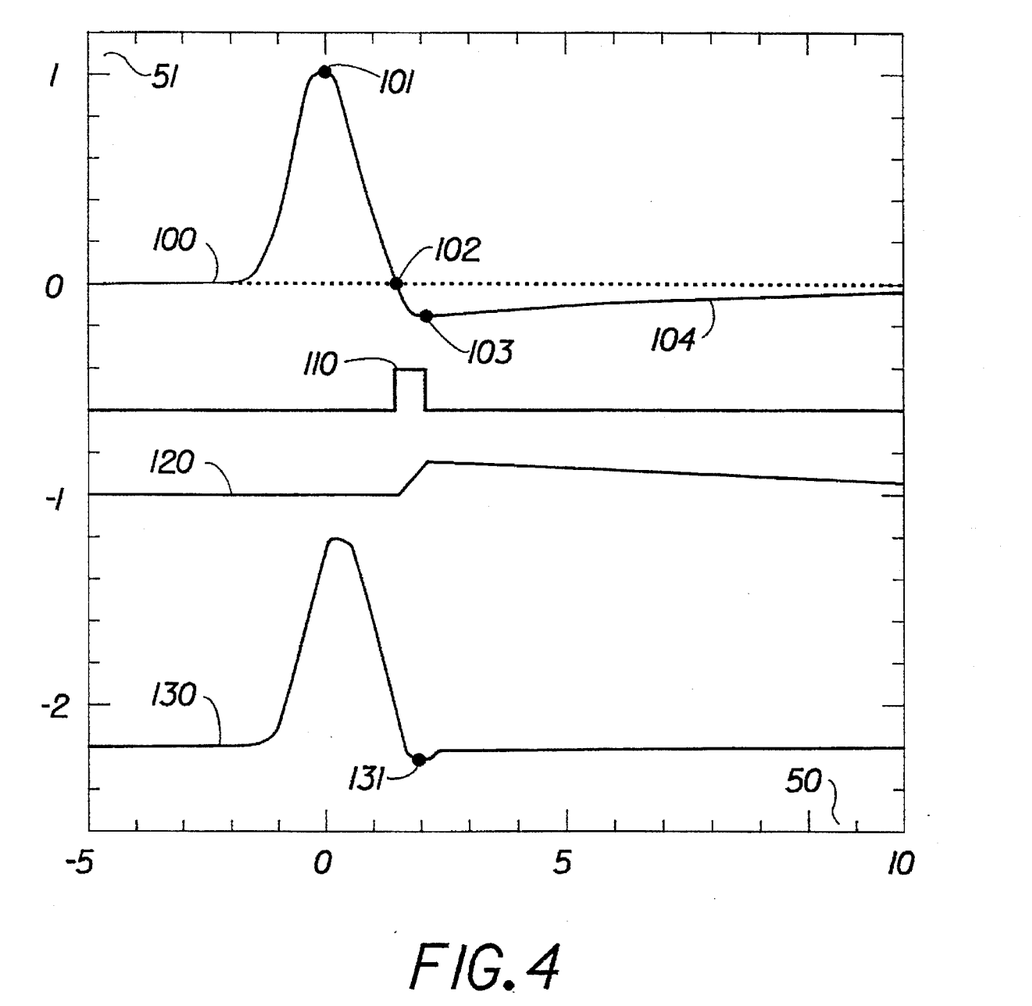
FIG. 4 shows a graphical representation for decision feedback equalization for CP recording.

Referring to FIG. 4, DFE is shown for CP recording. In FIG. 4, X-axis 50 in units of clock periods and Y-axis 51 is normalized signal voltage. A qualified peak 101 of causal equalized pulse 100 is detected. A rectangular pulse 110 is generated following a short delay in response to detection of qualified peak 101. Rectangular pulse 110 starts at a time approximately corresponding to zero-crossing 102 following qualified peak 101 of causal equalized pulse 100. Rectangular pulse 110 ends at a time approximately corresponding to opposite polarity peak 103 of causal equalized pulse 100. Rectangular pulse 110 is passed through a low-pass filter whose decay time, $\tau$, is graphically shown with respect to decay 121 of low-pass filtered signal 120. Decay time 121, as graphically shown, is approximately equal to decay time 104, as graphically shown, of the causal equalized pulse 100. Low-pass filtered signal 120 is the result of passing pulse 110 through a simple one pole RC low-pass filter with time constant $\tau=RC\approx1/f_L$. A preferred embodiment of the RC low-pass filter may contain two or more poles to smooth the signal.

Low-pass filtered signal 120 is then added to causal equalized pulse 100 to produce DFE equalized pulse 130. The peak amplitude of low-pass filtered signal 120 is set to the inverse of negative peak 103 of causal equalized pulse 100. Thus, DFE equalized pulse 130 has an amplitude of zero at a time corresponding to the peak amplitude of low-pass filtered signal 120. Small bump 131 on DFE equalized pulse 130 has little effect on system performance. Small bump 131 is a result of using a simple one pole RC-low-pass filter. Low-pass filtered signal 120 can be made to more closely resemble DFE difference pulse 34 of FIG. 3 by employing a higher order low-pass filter. A higher order low-pass filter in that case would comprise more poles than a simple one pole RC low-pass filter. Thus, small bump 131 can be further reduced with a higher order low-pass filter.

Figure 5:
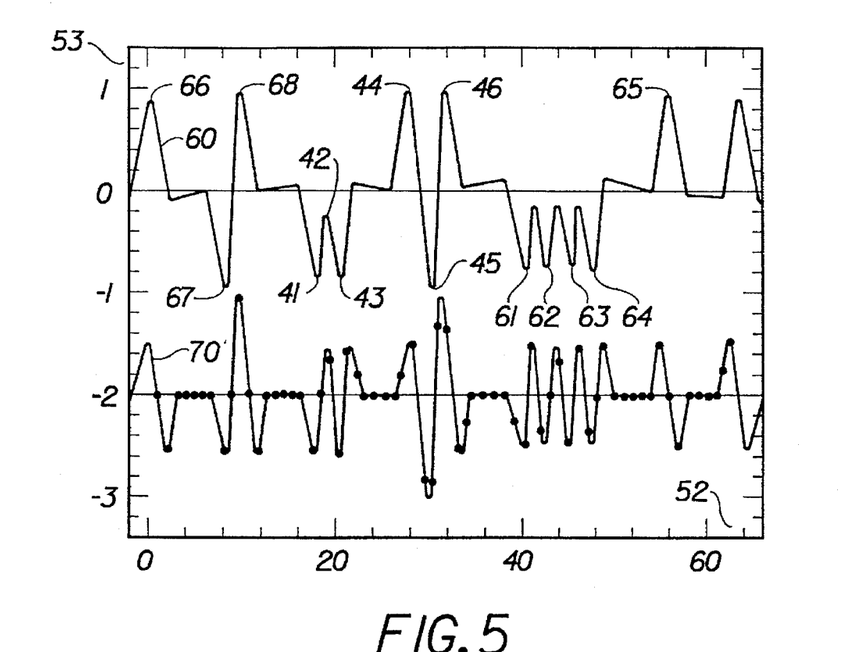
FIG. 5 shows a graphical representation of a data pattern for symmetrical equalization according to the present invention.
Figure 6:
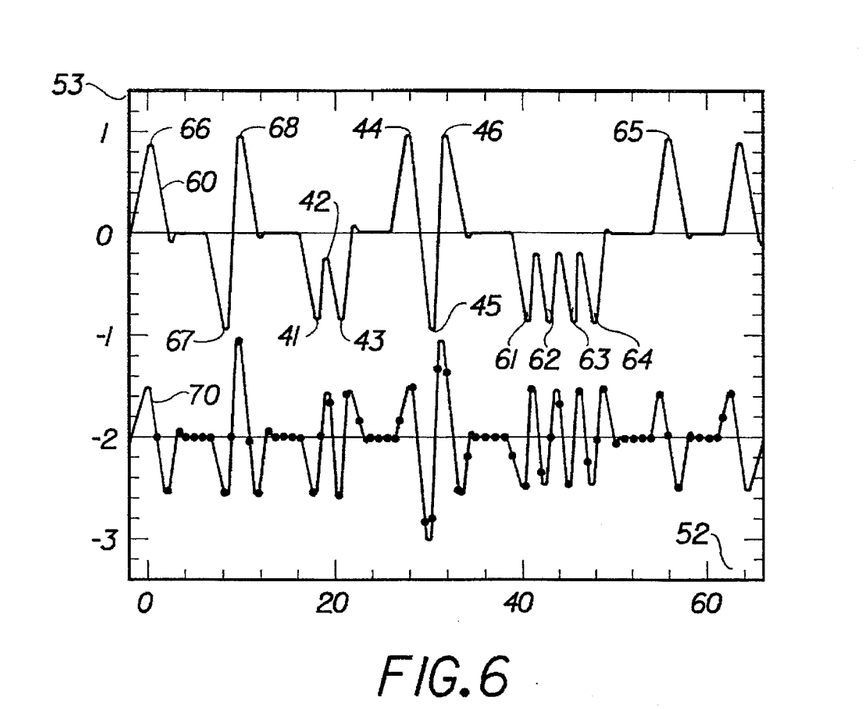
FIG. 6 shows a graphical representation of causal equalization with decision feedback equalization according to the present invention.

DFE improves system performance by greatly reducing baseline shift. In FIG. 5 and FIG. 6, signal 60 is an equalized signal and signal 70 is a detector signal. In FIG. 5, X-axis 52 is in units of clock periods and Y-axis 53 is normalized signal voltage. In the preferred embodiment of the present invention, a differentiator is used to produce the zero-crossing detector signal 70. The small rectangular objects as illustrated on detector signal 70 indicate the signal level at the clock period to provide a rough estimate of performance. In both FIG. 5 and FIG. 6, a data pattern for (3,15) CCRLL modulation code for CP recording was used to produce signal 60. This data pattern substantially resembles data patterns for the preferred embodiment (2,k) and (4,k) codes. Equalized signal 60 of FIG. 5 is an output of read equalizer 208 for symmetrical equalization, and equalized signal 60 of FIG. 6 is a output of read equalizer 208 for causal equalization having DFE.

The data pattern of signal 60 comprises a relatively isolated pulse 66, a $T_{min}$ pair 67 and 68, a $T_0$ (minimum spacing same-polarity) pair 41 and 43, a $T_{min}$ triplet 44, 45 and 46, four $T_0$ pulses 61 through 64, and a same-polarity isolated pulse 65. The spacing between the pulses in $T_c$ units is as follows: $16T_c$ units between pulses 66 and 67, $4T_c$ units between pulses 67 and 68, $16T_c$ units between pulses 68 and 41, $5T_c$ units between pulses 41 and 43, $16T_c$ units between pulses 43 and 44:, $4T_c$ units between pulses 44 and 45, $4T_c$ units between pulses 45 and 46, $16T_c$ units between pulses 46 an 61, $5T_c$ units between pulses 61 and 62, $5T_c$ units between pulses 62 and 63, $5T_c$ units between pulses 63 and 64, and $15T_c$ units between pulses 64 and 65. It should be noted there is a distinctly resolvable positive peak 42 between $T_0$ same-polarity negative peaks 41 and 43. Peak 42 is clearly distinguishable from an opposite-polarity peak, because the normalized amplitude threshold for a positive polarity peak is +0.5. In other words, pulse polarity determines amplitude threshold. Moreover, peak 42 appears too soon for an opposite-polarity peak.

Referring to FIG. 5, the pattern for symmetrical equalization without DFE is shown. Baseline shift causes same-polarity peaks 61, 62, 63 and 64 to have considerably reduced amplitude as compared to relatively isolated pulse 65. This results in a relatively poor amplitude channel performance for peaks 61 through 64.

Now referring to FIG. 6, the same data pattern as shown in FIG. 5 is illustrated. However, data pattern of signal 60 in FIG. 6 is for causal pulse equalization with DFE. Thus, peaks 61 through 64 show little amplitude loss. This results in significant improvement of amplitude channel performance. Amplitude channel performance is normally the limiting factor in CP recording, as CP recording systems typically have excellent timing channel performance due to a large detection window.

Design of DFE circuits are well-known in the art of the present invention.

Read Equalizer Design

Figure 9:
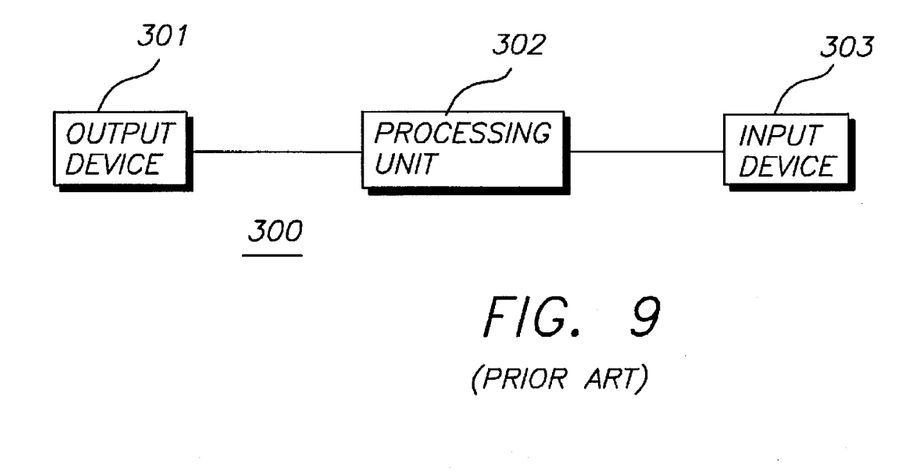
FIG. 9 shows a computer.

A read equalizer, in accordance with the present invention, has pole and zero locations which may be determined with computer 300 by a computer program whose inputs are the digitized write equalized isolated pulse (the equalizer input signal), the idealized read equalized pulse (the desired read equalizer output signal), and a rough estimate of the equalizer pole and zero locations. This rough estimate can be made by anyone with ordinary skill in the art of the present invention.

Referring to FIG. 9, computer 300 comprises a processing unit 302, an output device 301 and an input device 303. Information may be supplied to computer 300 through input device 303 to processing unit 302. Processing unit 302 includes media storage and retrieval means (not shown) for storing and retrieving information to and from computer 300. Information may be supplied from computer 300 through output device 301 from processing unit 302. Computer 300 comprises no part of the present invention, and any of a variety of well-known computers may be used in practicing the art as taught by the present invention.

Poles act as low-pass filter elements and their precise number is not critical. Zeros on the positive and negative real axes tend to slim pulses. The closer zeros are to the origin of the real axis the more the pulses are slimmed. For determining the poles of the idealized read equalized pulse, $f_L$ is set so that the undershoot risetime approximates the risetime of the write equalized isolated pulse. Additionally, $f_c$ is chosen so that intersymbol interference (ISI) peak shift between neighboring pulses is largely eliminated. Some ISI between neighboring pulses is tolerated as a trade-off to avoid excessive high frequency noise enhancement.

In the present invention, a computer program is used to move poles and zeros around the complex plane under control of an optimizer subroutine until a best least squares match between a desired equalizer output signal and a target signal is found. This is done in the time domain using the inverse Fourier transformation of equations representing the frequency domain of the idealized equalized pulse to be approximated. For example, the inverse Fourier transformation of equations (3A) and (3B). Computer programs for moving poles and zeros around the complex plane are well-known in the art of the present invention, and form no part of the present invention.

From the optimizer subroutine, the actual equalizer output signal is found from the best least squares match fit. Subroutines to form this type of computer optimization are well known in the art of the present invention, and form no part of the present invention. Once such subroutine is found in the product called "The Optimization Tool Box for MAT-LAB" from Math Works of Natick, Mass. As disclosed above, an example of a transfer function having seven poles and two zeros was used to provide output pulses 27 and 32 of FIG. 2 and FIG. 3. Moreover, as disclosed above, programmable equalizer chips are available for implementing determined locations of pole(s) and zero(s).

Referring again to FIG. 5, baseline shift for a data pattern of symmetrical equalizer signal 60 is shown having four pulses of the same-polarity in a row, namely, 61 through 64. Same-polarity pulses 61 through 64 are spaced apart by $T_0$, the minimum same-polarity spacing allowable. Baseline shift in this pattern results in a reduction in the amplitude of these pulses. In particular, pulses 62 and 63 have a reduced amplitude. The number of sequential same-polarity pulses is limited by the charge constraint of a CCRLL code. In a CCRLL code, according to the preferred embodiment of the present invention, a positive pulse has a charge of +1 and a negative pulse has a charge of −1, as normalized with respect to code periods. Baseline shift would be absent if the isolated pulse had a normal d.c. content; thus, the isolated pulse would have no undershoot. This is the case for the pulse whose frequency domain representation is $\cos^n(\pi f/2f_c)$ for $|f|<f_c$ and 0 for $|f|\geq f_c$.

Detector

Read equalized signal 209 from read equalizer 208 is fed to detector 210 as shown in FIG. 1. In the preferred embodiment of the present invention, detector 210 is an amplitude-qualifying peak detector including means for sensing pulse polarity. Amplitude-qualifying peak detectors are well-known in the art of the present invention. Moreover, sensing pulse polarity is also well-known in the art of the present invention. Pulse polarity is the polarity of the amplitude channel signal at the time a zero-crossing is detected in the detector (differentiating timing) channel. Zero-crossing detectors sense polarity either from minus to plus or plus to minus of a signal in a differentiating timing channel. In a differentiating timing channel, the output signal is proportional to the rate of change of the input signal.

Pulse polarity is used to determine which of two sets of detection windows to use. Circuitry for selecting between detection windows is well-known in the art of the present invention. As is known in the art of the present invention, CP recording systems employ two sets of detection windows. Thus, CP recording systems are favored in that the detection window size is increased over prior art. For (d,k) RLL modulation codes for CP recording with even d, positive pulses are detected in reference to one window set, while negative pulses are detected in the other window set. For (d,k) RLL modulation codes for CP recording with odd d, the same window set is kept when the present pulse has the opposite-polarity as the previous pulse, and the window set is switch selected if the present pulse has the same-polarity as the previous pulse. The latter rule can result in error propagation in the case of a missing bit or bits. In the preferred embodiment of the present invention, (d,k) RLL modulation codes with even d are used to avoid error propagation. In the present invention, for N=1 and R=2, the added pulse period is twice the code period when a $d\geq 2$ modulation code is employed.

For CP recording with RLL modulation codes, detection windows are twice the normal length as in non-CP recording with RLL modulation codes, i.e., $T_w=2T_c$. Additionally, the centers of one set of windows coincides with the edges of the other set of windows in CP recording. Amplitude-qualifying peak detector 210 may include means for sensing pulse polarity. For example, if $A_{th}$ is an amplitude threshold, a positive peak amplitude must be greater than $+A_{th}$ and a negative peak amplitude must be less than $-A_{th}$. Peaks are detected by detector 210 with reference a data-derived clock signal.

In accordance with the present invention, same-polarity peaks require minimum spacing, $T_0$, where $T_0=T_c(d+2)$. In the prior art, minimum time between same-polarity peaks $T_0$, was set to $T_{min}=(d+4)T_c$. The minimum sparing for same-polarity peaks according to the present invention was thus excluded in the prior art of CP recording. With the present invention, a pulse may be detected in one of two sets of detection windows depending on its polarity. Selecting between detection windows is further explained elsewhere in this specification.

Modulation Decoder

Detector 210 provides an encoded signal 211 to modulation decoder 212. Modulation decoder 212 decodes encoded signal 211. In the preferred embodiment of the present invention, encoded signal 211 is substantially similar to encoded signal 203. Modulation decoder 212 uses the same format as modulation encoder 202, namely, (d,k) RLL modulation codes for decoding. Modulation decoder 212 provides an output data signal 213 from decoded encoded signal 211. Output data signal 213 is substantially similar to input data signal 201. Construction of modulation decoder 212 is well-known in the art of the present invention.

Code Properties

A CP recording system employing a (d,k) RLL modulation code, implemented with a modulation encoder and decoder, has been disclosed. Additionally, in a preferred embodiment, the modulation code has been charge-constrained according to rules for charge buildup in CP recording, namely, +1 for positive pulses and −1 for negative pulses. In the preferred embodiment of the CP digital magnetic recording system, employing an RLL modulation code, an even minimum run-length, d, equal to 2 or 4 has been disclosed. More specifically, preferred codes in accordance with the present invention are (2,8), (2,10), (4,14) and (4,16). Even valued minimum run-length minimizes the likelihood of error propagation by making the selection of a detection window determined by pulse polarity, as opposed to the difference in polarity between present and previous pulses, as is the case for an odd minimum run-length. The detection window being switched if two pulses have the same polarity for even-d modulation codes. However, the present invention may also be practiced with an odd-d modulation code.

CP recording using a (3,15) code in accordance with the present invention is disclosed elsewhere herein. This code has exactly the same minimum time between transitions and the same detection window size as a prior art write equalized 2/3 (1,7) code. However, the code period as compared between the two codes is different as explained elsewhere herein. For codes with even values of d, the choice of detection window is based on pulse polarity only.

UMR head saturation is a potential problem with CP recording because the write current is not necessarily d.c.-free. For example, in a standard NRZI RLL recording, a (1,7) or (2,7) code will accumulate charge up to plus or minus 8, as normalized with respect to code periods. Such saturation can be avoided by using CCRLL modulation codes specially designed for CP recording, where accumulated charge is limited to +1 for pulses of positive polarity and −1 for pulses of negative polarity. In CCRLL modulation codes for standard recording, charge is limited to plus or minus the recorded interval in code periods. Thus, significantly less charge as compared to standard NRZI RLL recording is accumulated. A procedure for determining the maximum capacity of very similar RLL codes with this very specific type of charge constraint is known in the art of the present invention. Because charge per transition for CP recording is limited to plus or minus 1, the capacity lost for a given charge constraint is much less than for conventional (d,k) RLL modulation code recording.

A charge constraint of c equal to 2 or 3 is reasonable for CP recording. Attainable code rates may be estimated based on the charge constraint. Code rates are usually chosen to be rational fractions slightly below the maximum capacity of the recording channel. For example, the unconstrained code capacity of a (2,7) code is 0.5174. Standard (2,7) code operates at a code rate of 1/2. The unconstrained code capacity of a (2,10) code is 0.5418. For (2,10) code with c equal to 2, code capacity is 0.5156, and for (2,10) code with c equal to 3, code capacity is 0.5300. Thus, a charge constrained code rate of 1/2 should be possible in either case where c equals 2 or 3. Also, by way of example, an 8/17 (2,10) code should be possible to design with adequate charge constraint. The unconstrained capacity of a (4,13) code is 0.3937. A charge-constrained code rate of 4/7 equals 0.3636 and should be possible to design. The design of CCRLL codes appropriate for CP recording can be accomplished by those with ordinary skill in the art of the present invention.

CP recording increases the timing margin without affecting the amplitude margin. For this reason, CP recording is best applied where timing margin is worse than amplitude margin. Most magnetic recording falls into this category. As is known in the art of the present invention, increasing d in a (d,k) RLL modulation code tends to improve the amplitude channel at the expense of the timing channel. For this reason, large d codes such as (4,k) are included as a preferred embodiment of the present invention.

Examples of Modulation Codes

Figure 7:
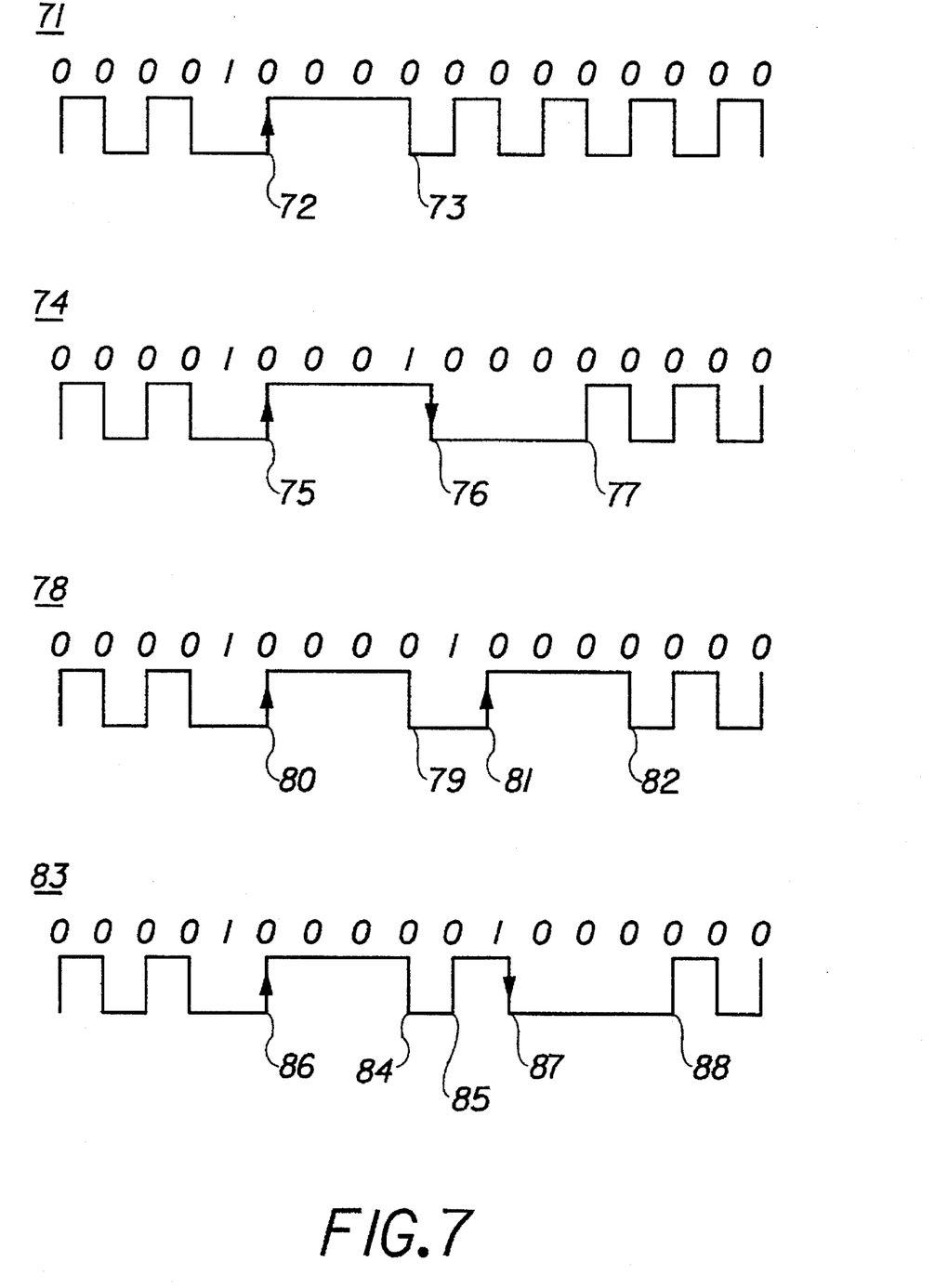
FIG. 7 shows a graphical representation of write currents for a (3, 15) RLL modulation code in accordance with the present invention.

A (3,15) RLL modulation code illustrates an application of the present invention for CP recording. A (3,15) RLL modulation code was chosen due to its relationship with prior art write equalized (1,7) RLL modulation code. Because (3,15) RLL modulation code has an odd d, making it subject to error propagation, it is not a preferred embodiment of the present invention for CP recording. Referring to FIG. 7, write currents for (3,15) RLL modulation code are shown for write equalization parameters: W=1, Q=0.5, P=4, and R=2. Notably, there is only one added transition per code period.

For pulse pattern 71, NRZI . . . 0001000 . . . , data transition 72 is a data 1 transition, and transition 73 is the first added CP transition. Transition 73 is located at the fourth ((d+1)th) "0" following data transition 72, a data 1 transition.

Pulse pattern 74 is a $(T_{min})$ data pattern of the form $(d+1)$ $T_c$, namely, the minimum spacing for opposite-polarity pulses. There are no added transitions between opposite polarity data 1 transitions 75 and 76. Transition 77 is the first added CP transition following data 1 transition 76.

Pulse pattern 78 is a $(d+2)T_c$ data pattern, namely, the minimum spacing for same-polarity pulses. To preserve the data of pulse pattern 78 upon readback, one CP transition 79 is added between same-polarity data 1 transitions 80 and 81. Transition 82 is the first added CP transition following data 1 transition 81.

Pulse pattern 83 is a $(d+3)T_c$ data pattern, namely, the second shortest spacing for opposite-polarity pulses. In pulse pattern 83, write current for the second shortest spacing between opposite polarity pulses has added transitions 84 and 85 between opposite-polarity data 1 transitions 86 and 87. Transition 88 is the first added CP transition following data 1 transition 87.

In FIG. 7, arrows indicate the polarity of a code "1" pulse. Notably, opposite-polarity patterns are exactly the same as for prior art write equalized (1,7) RLL modulation code effectively having twice the code period of the (3,15) code according to the present invention. In other words, the code rate for the (3,15) RLL modulation code according to the present invention is effectively equal to twice the code rate of prior write equalized (1,7) RLL modulation code. Thus, the code period of prior (1,7) RLL modulation code is effectively $2T_c$, where $T_c$ is the code period according to the present invention for (3,15) RLL modulation code. Prior (1,7) RLL code modulation has write equalization parameters half of those as shown for the write currents for (3,k) RLL modulation code for CP recording according to the present invention. In prior write equalized (1,7) RLL modulation code, having effectively half the clock rate of (3,k) RLL modulation code for CP recording according to the present invention, the write equalization parameters are: W=0.5, Q=0.25, P=2 and R=1.

Figure 8:
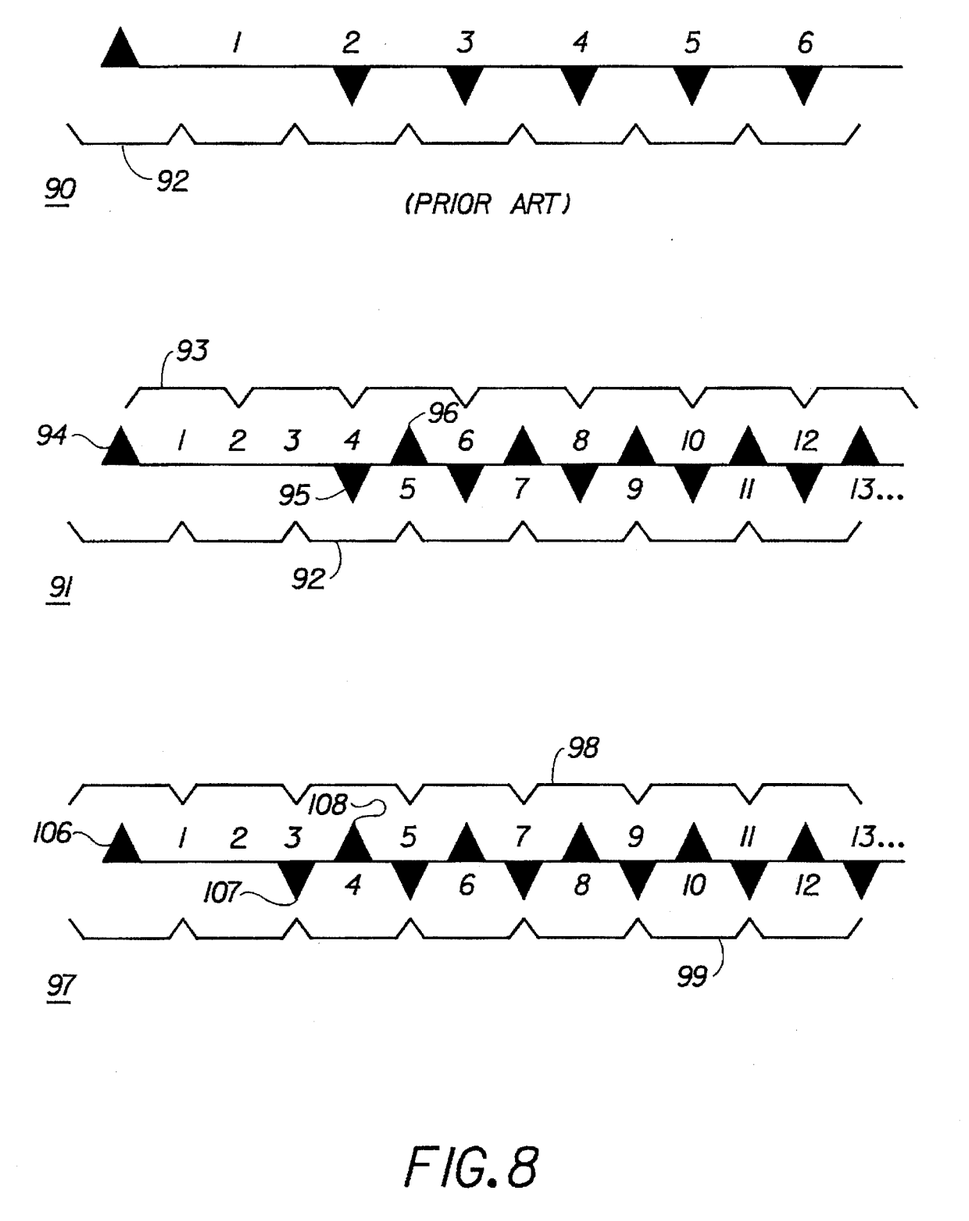
FIG. 8 shows graphical representations of pulse patterns and detection windows for CP recording for the prior art as compared with the present invention.

Referring to FIG. 8, pulse patterns and detection windows for CP recording are shown. In FIG. 8, numbers indicate clock intervals (code periods) between pulses. With respect to pulse pattern 90, prior art (1,7) RLL modulation code is shown. With respect to pulse pattern 91, (3,k) RLL modulation code for CP recording according to the present invention having effectively half the code period of prior (1,7) RLL modulation code is shown. It should be noted that pulses, as shown in FIG. 8, are not intended to represent actual read pulses, rather, such pulses are merely for illustrating the differences between the present invention and the prior art. Detection windows 92 and 93 are shown with respect to pulse patterns 90 and 91. For prior art, (1,7) RLL modulation code recording, only one set of detection windows 92 can be used. However, for (3,k) RLL modulation code for CP recording according to the present invention, two sets of detection windows 92 and 93 can be used. Detection windows 92 and 93 are offset by $T_c$, such that the centers of detection windows 92 correspond to the edges of detection windows 93. Moreover, the centers of detection windows 93 likewise correspond to the edges of detection windows 92.

If a pulse has opposite-polarity as compared to a previous pulse, where polarity of a signal is detected as explained elsewhere in this specification, the same detection window set 92 or 93 is selected for detection. If a pulse has same-polarity of a previous pulse, detection window sets 92 and 93 are switch selected in accordance with the sensed polarity. For example, referring to pulse pattern 91, where pulses pointing upward are considered positive and pulses pointing downward are considered negative for reference. For example, pulse 94 is a positive pulse, and pulse 95 is a negative pulse.

Pulse 94 is detected within detection window 92. Pulse 95, opposite in polarity to pulse 94, is also detected in detection window 92. Pulse 96, which has the same polarity as pulse 94, is detected in detection window 93.

Pulse pattern 97 is for a (2,k) RLL modulation code for CP recording in accordance with the present invention. In the preferred embodiment of the present invention, d is even. Thus, pulse pattern 97 is an illustration of a preferred embodiment of the present invention for (2,k) RLL modulation code. Detection window 98 or 99 is selected by pulse polarity only. The period of detection window 98 and 99 is $T_w$, respectively. Detection window period $T_w$ is equal to the code period for prior art non-CP recording and equal to twice the code period for CP recording generally. Pulse 106 is a positive polarity pulse and is detected in detection window 98. Pulse 107 is a negative polarity pulse and is detected in detection window 99.

FIG. 8 illustrates how CP recording increases the information carrying capacity over conventional recording by increasing the number of available symbols without changing other code parameters. CP recording for (3,15) RLL modulation code may be thought of as identical to prior art write equalized (1,7) non-CP recording, except that (3,15) RLL modulation code for CP recording according to the present invention adds additional same-polarity pulses at intervals of $(d+3/2)T_w, (d+5/2)T_w$, etc.

The relative code rates of (1,7) RLL modulation code for non-CP recording and (3, 15) RLL modulation code for CP recording according to the present invention, where both codes have the same $T_{min}$ and $T_w$, can be compared with code periods. It should be noted that (1,7) RLL modulation code for non-CP recording with no charge constraint has a maximum code rate of 0.6793 and operates at an actual code rate of m/n=2/3=0.6667, as is known. Comparing code periods, $T_{c(1,7)}=m/nT_{d(1,7)}=2T_{c(3,k)}$, so that $T_{d(1,7)}=2T_{c(3,k)}/(2/3)=3T_{c(3,k)}$. (3,15) RLL modulation code for CP recording in accordance with the present invention with no charge constraint has a maximum code rate of just over 0.46. A code rate of 3/7=0.4286 therefore should be attainable with reasonable charge constraint, $T_{d(3,15)}=7/3T_{c(3,15)}$. Because the data rate, and hence the density, is the inverse of the data period $T_{d(d,k)}$, the relative density for (3,15) RLL modulation code for CP recording according to the present invention is $T_{d(1,7)}/T_{d(3,15)}=9/7$. Therefore, there is a density gain of approximately 28.6%. Additionally, if the code rate had to be reduced to 2/5, the next simple fraction down from 3/7, to limit accumulated charge and UMR head saturation, a density gain for data of the present invention as compared to prior art would still be obtainable on the order of a 20% density gain.

In the present invention, RLL modulation codes having even minimum run-length, &constraints are employed. In the preferred embodiment of the present invention, RLL modulation codes of 1/2(2,k) and 8/17(2,k), where $8 \leq k \leq 10$, 3/8(4,16) and 4/11(4,16) are used. The data rates for these codes (code rates) are sufficiently below capacity. The data rates are respectively 0.40 for (4,16), 0.5293 for (2,8) and 0.5418 for (2,10). These data rates are selected sufficiently below recording channel capacity in order to be attainable with reasonable charge constraint. As described above for (2,10) code with c equal to 2 in one example and 3 in another, the code capacities are 0.5156 and 0.5300, respectively. As disclosed elsewhere in this specification, CCRLL codes are used to control accumulated charge for particular applications of the present invention. An even k-constraint is preferred to minimize charge accumulation. For an even k-constraint, pulses in a $T_{max}$ pattern will alternate in polarity, and thus, minimizing charge accumulation.

It should be noted that (4,16) RLL modulation code in accordance with the present invention for CP recording may achieve performance very similar to (3,15) RLL modulation code in accordance with the present invention for CP recording. Moreover, (4,16) RLL modulation code in accordance with the present invention can have an amplitude margin better than that of (2,k) RLL modulation code in accordance with the present invention for CP recording. Write equalization parameters for the (4,16) RLL modulation code for CP recording in accordance with the present invention as simulated for comparison with other codes, were W=1, Q=1, P=5 and R=2. The data pattern for (4,16) RLL modulation code for CP recording closely resembles the data pattern of (3,15) RLL modulation code for CP recording of the present invention as shown in FIG. 5. A difference between these two codes with respect to FIG. 5, is that peak 42, the amplitude of which must be rejected between same polarity peaks 41 and 43, is somewhat closer to the amplitudes of peaks 41 and 43. However, sufficient difference should exist for amplitude discrimination between peaks 41, 42 and 43. Write current waveforms for the preferred embodiment of the present invention with even d modulation codes, substantially resemble waveforms for the (3,k) RLL modulation code for CP recording in accordance with the present invention with the exception that the minimum run-length and minimum number of "0"s prior to added transitions varies proportionally to d.

CP recording channels have twice the detection window of standard (d,k) RLL channels with, non-CP, with the same $T_{min}$ and code period, with or without write equalization. Since a typical amplitude-qualified peak detecting magnetic recording channel is limited by timing channel performance, a net performance gain can be obtained with CP recording. CP recording channels are particularly well matched to the response of UMR and DMR heads. Practical (2,k) and (4,k)

RLL modulation codes for CP recording channels have been described in accordance with the present invention. Such recording channels can increase recording density over comparable standard (d,k) RLL channels, Such as write equalized (1,7). Moreover, write frequency of CP recording is lower than those of standard write equalization, because there is only one added transition per clock period instead of two. This can be an advantage with frequency-limited magnetic heads or with density-limited magnetic media.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. The invention illustratively disclosed herein may be practiced without any element which is not specifically disclosed herein.

What is claimed is:

1. A controlled polarity system having an equalized recording channel for recording and retrieving data, the system comprising:

an encoder for receiving a first data signal representing the data and for providing a first encoded signal therefrom, the encoder encoding in a (d,k) run-length limited modulation code to provide the first encoded signal, the first encoded signal having a clock period of the code;

a write equalizer coupled to the encoder for receiving the first encoded signal and adding an odd number of equalization transitions, at least one transition for a zero code, to the write current for code 0's between written transitions for code 1's that are to be read back as same-polarity pulses and adding an even number of equalization transitions, at least two transitions for a zero code, for code 0's between written transitions for code 1's that are to be read back as opposite polarity pulses for providing a write equalized signal therefrom;

a signal channel coupled to the write equalizer for recording of the first equalized signal and for providing a readback signal upon retrieval of the write equalized signal as recorded;

a read equalizer coupled to the signal channel for receiving the readback signal and for providing a read equalized signal therefrom, said read equalizer having an equalized isolated pulse response to a d.c.-free, write equalized isolated pulse having the . . . 0001000 . . . data pattern and permitting the resolution of d+1 run length, same-polarity code patterns;

a detector coupled to the read equalizer for receiving the read equalized signal and for providing a second encoded signal therefrom; and a decoder coupled to the detector for receiving the second encoded signal and for providing a second data signal therefrom.

2. A system, as recited in claim 1, wherein the write equalizer is characterized by a transfer function equation of:

$$G_{wreq}(\omega) = e^{-j\omega T_c Q} \frac{(1 - e^{-j\omega T_c W})(1 + e^{-j\omega T_c P})}{1 - e^{-j\omega T_c R}}$$

where R is equal to 2/(2N−1) for N an integer greater than or equal to 1 in units of the clock period of the code.

3. A system, as recited in claim 2, wherein the write equalizer adds an odd number of identically spaced transitions per the clock period of the code to the write current starting with the (d+1)th 0 following a 1.

4. A system, as recited in claim 1, wherein the read equalized isolated pulse is approximated by a frequency domain equation of:

$$F_{sym}(f) = \cos^n\left(\frac{\pi f}{2f_c}\right)\frac{f}{f + f_L} \; ; \; |f| \leq f_c$$

$$= 0; \quad |f| > f_c$$

5. A system, as recited in claim 1, wherein the read equalized isolated pulse is approximated by a frequency domain equation of:

$$F_{caus}(f) = \cos^n\left(\frac{\pi f}{2f_c}\right)\frac{f}{f - jf_L} \; ; \; |f| \leq f_c$$

$$= 0; \quad |f| > f_c$$

$$f_L \ll f_c$$

6. A system, as recited in claim 1, wherein the read equalizer includes decision feedback equalization.

7. A system, as recited in claim 1, wherein the decoder decodes the (d,k) run-length limited modulation code.

8. A system, as recited in claim 7, wherein the detector includes amplitude-qualifying peak sensing means for detecting events in the second equalized signal.

9. A system, as recited in claim 8, wherein the detector includes means for sensing zero-crossings corresponding to peaks in the second equalized signal.

10. A system for recording and retrieving data, the system having an equalized recording channel for generating a controlled polarity signal, the system comprising:

a modulation encoder for receiving a first digital data signal representing the data and for providing a first encoded signal therefrom, the encoder encoding in a (d,k) run-length limited modulation code to provide the first encoded signal, the modulation code having a code period;

a write equalizer coupled to the encoder for receiving the first encoded signal and for providing a first equalized signal therefrom, the write equalizer adding an odd number of equalization transitions, at least one transition for a zero code, to the write current for code 0's between written transitions for code 1's that are to be read back as same-polarity pulses and adding an even number of equalization transitions, at least two transitions for a zero code, for code 0's between written transitions for code 1's that are to be read back as opposite polarity pulses to provide the first equalized signal, the added equalization transitions defining a pulse, the pulse having a period R defined by the equation 2/(2N−1), where N is an integer at least equal to one in units of the code period;

a signal channel coupled to the write equalizer for recording of the first equalized signal and for providing a readback signal upon retrieval of the first equalized signal as recorded;

a read equalizer coupled to the signal channel for receiving the readback signal and for providing a second equalized signal therefrom, said read equalizer having an equalized isolated pulse response to a d.c.-free, write equalized, isolated pulse having the . . . 0001000 . . . data pattern and permitting the resolution of d+1 run length, same-polarity code patterns;

a detector means coupled to the read equalizer for receiving the second equalized signal and for providing a second encoded signal therefrom, the detector means including polarity sensing means for sensing polarities of the second equalized signal; and a modulation decoder coupled to the detector for receiving the second encoded signal and for providing a second data signal therefrom, the modulation decoder decoding the (d,k) run-length limited modulation code.

11. A system, as recited in claim 10, wherein the write equalizer adds at least one transition per clock period of the code.

12. A system, as recited in claim 11, wherein the write equalizer adds an odd number of identically spaced transitions per the code period to the write current starting with the (d+1)th 0 following a 1.

13. A system, as recited in claim 10, wherein the detector means includes amplitude-qualifying peak detection means for detecting peaks of the second equalized signal in relation to a predetermined threshold.

14. A system, as recited in claim 13, wherein the read equalizer incudes decision feedback equalization means for restoring d.c. content to the readback signal.

15. A system, as recited in claim 10, wherein the detector means includes a first and a second detection window.

16. A system, as recited in claim 15, wherein the detector means includes selection means for selecting between the first and the second detection window.

17. A system, as recited in claim 16, wherein the selection means between the first and the second detection window is based on the detected polarity of peaks in the second equalized signal when d of the (d,k) run-length limited modulation code is an even integer.

18. A system, as recited in claim 10, wherein the (d,k) run-length limited modulation code is charge-constrained.

19. A system, as recited in claim 18, wherein the signal channel includes at least one head for magnetic recording and retrieval of data, the head selected from the group consisting of an unshielded magnetoresistive head, a dual magnetoresistive head, a shielded magnetoresistive head and an inductive readback head.

20. A system for recording and retrieving data, the system having an equalized recording channel for generating a controlled polarity signal, the controlled polarity signal including code 1's and code 0's binary data, the system comprising:

a modulation encoder for receiving a first data signal representing the binary data and for providing a first encoded signal therefrom, the encoder encoding in a charge-constrained (d, k) run-length limited modulation code to provide the first encoded signal, the modulation code having a code period;

a write equalizer coupled to the encoder for receiving the first encoded signal and for providing a first equalized signal therefrom, the write equalizer providing the first equalized signal through a linear process, the write equalizer adding an odd number of equalization transitions, at least one transition for a zero code, to the write current for code 0's between written transitions for code 1's that are to be read back as same-polarity pulses and adding an even number of equalization transitions, at least two transitions for a zero code, for code 0's between written transitions for code 1's that are to be read back as opposite polarity pulses, a pair of added transitions defining pulses, the pulses having associated pulse periods R, the pulse periods R being defined by the equation 2(2N−1), where N is an integer at least equal to one in units of the code period;

a signal channel coupled to the write equalizer for recording of the first equalized signal and for providing a readback signal upon retrieval of the first equalized signal as recorded, the signal channel including transducer means and magnetic media for the recording and the retrieval of the first equalized signal;

a read equalizer coupled to the signal channel for receiving the readback signal and for providing a second equalized signal therefrom, said read equalizer having an equalized isolated pulse response to a d.c.-free, write equalized isolated pulse having the . . . 0001000 . . . data pattern and permitting the resolution of d+1 run length, same-polarity code patterns;

a detector means coupled to the read equalizer for receiving the second equalized signal and for providing a second encoded signal therefrom, the detector means including polarity sensing means for sensing polarities in the second equalized signal; and a modulation decoder coupled to the detector for receiving the second encoded signal and for providing a second data signal therefrom, the modulation decoder decoding the (d,k) run-length limited modulation code to provide the second data signal.

21. A system, as recited in claim 20, wherein the write equalizer adds at least one transition per the code period to the first encoded signal, the transition added to the first encoded signal at a (d+1)th code 0 following one of the code ones.

22. A system, as recited in claim 21, wherein the write equalizer adds an odd number of identically spaced transitions per the code period to the write current starting with the (d+1)th 0 following a 1.

23. A system, as recited in claim 22, wherein the transition is added following a non-return to zero inverted code one in the first encoded signal.

24. A system, as recited in claim 20, wherein the (d,k) run-length limited modulation code includes a run-length of d+1, wherein run-length is defined as the number of 0's between adjacent 1's, said code pattern having adjacent readback pulses of the same-polarity, the system capable of resolving said same-polarity code pattern for the d+1 run length.

25. A system, as recited in claim 20, wherein the (d,k) run-length limited modulation code includes run-lengths of d plus an odd integer, the run-lengths of d plus an odd integer having adjacent readback pulses of same-polarity.

26. A system, as recited in claim 25, wherein the (d,k) run-length limited modulation code is charge-constrained and d is an even integer.

27. A system, as recited in claim 25, wherein the (d,k) run-length limited modulation code includes minimum run-lengths of d+1, the system capable of resolving the d+1 run-length of a same-polarity pulse pattern.

28. A method for controlled polarity recording and retrieval of data comprising the steps of:

receiving a first data signal;

encoding the first data signal into a first encoded signal with a (d,k) run-length limited code;

write equalizing the first encoded signal through linear processing adding an odd number of equalization transitions, at least one transition for a zero code, to the write current for code 0's between written transitions for code 1's that are to be read back as same-polarity pulses and adding an even number of equalization transitions, at least two transitions for a zero code, for code 0's between written transitions for code 1's that are to be read back as opposite polarity pulses providing a write equalized signal therefrom;

converting the first equalized signal into a first recordable signal representative of the write equalized signal;

recording the first recordable signal;

retrieving the first recordable signal and providing a retrieved signal of the first recordable signal;

read equalizing the retrieved signal to provide a read equalized signal with a read equalizer having an equalized isolated pulse response to a d.c.-free, write equalized isolated pulse having the . . . 0001000 . . . data pattern and permitting the resolution of d+1 run length, same-polarity code patterns;

detecting events of the read equalized signal to provide a second encoded signal substantially similar to the first encoded signal; and decoding the second encoded signal to provide a second data signal substantially similar to the first data signal.

29. The method of claim 28 wherein the step of equalizing the first encoded signal includes the step of adding transitions to the first encoded signal.

30. The method of claim 29 wherein the step of detecting includes the step of sensing polarities of the events.

31. The method of claim 30 wherein the step of detecting includes the step of selecting between first and second detection windows based on sensed polarities of the events and the (d,k) run-length limited code.

32. A system, as recited in claim 10, wherein the read equalizer includes decision feedback equalization means for restoring the d.c. content to the readback signal.

* * * * *